United States Patent [19]
O'Donnell

[11] Patent Number: 6,134,897
[45] Date of Patent: Oct. 24, 2000

[54] AIR CONDITIONER FOR MOTOR VEHICLE

[76] Inventor: Dennis W. O'Donnell, 114 Lenox Ave., Pittsburgh, Pa. 15221

[21] Appl. No.: 09/186,756

[22] Filed: Nov. 5, 1998

Related U.S. Application Data

[63] Continuation-in-part of application No. 08/839,108, Apr. 23, 1997, abandoned.

[51] Int. Cl.[7] .............................. F04B 17/00; F25B 27/00
[52] U.S. Cl. ........................ 62/158; 62/323.3; 417/902
[58] Field of Search .................... 62/323.3, 508, 62/505, 158; 417/902

[56] References Cited

U.S. PATENT DOCUMENTS

| | | | |
|---|---|---|---|
| 2,175,914 | 10/1939 | Philipp | 62/508 X |
| 2,243,464 | 5/1941 | Kucher | 62/508 X |
| 2,963,216 | 12/1960 | Heitchue, Sr. | 62/505 X |
| 3,094,850 | 6/1963 | Newton | 62/323.3 X |
| 4,674,294 | 6/1987 | D'Agaro | 62/243 |
| 5,074,122 | 12/1991 | Babin et al. | 62/295 |

*Primary Examiner*—William Wayner
*Attorney, Agent, or Firm*—James Ray & Associates

[57] ABSTRACT

For a motor vehicle having an internal combustion engine, an air conditioning system having a refrigerant fluid contained within a sealed envelope. An electrical motor is located inside the sealed envelope which drives a compressor for the refrigerant fluid. Attachment means are provided for flowpaths which include a hot heat exchanger, an expansion valve, and a cold heat exchanger. Attachment means for mounting the system in a motor vehicle are also provided.

10 Claims, 3 Drawing Sheets

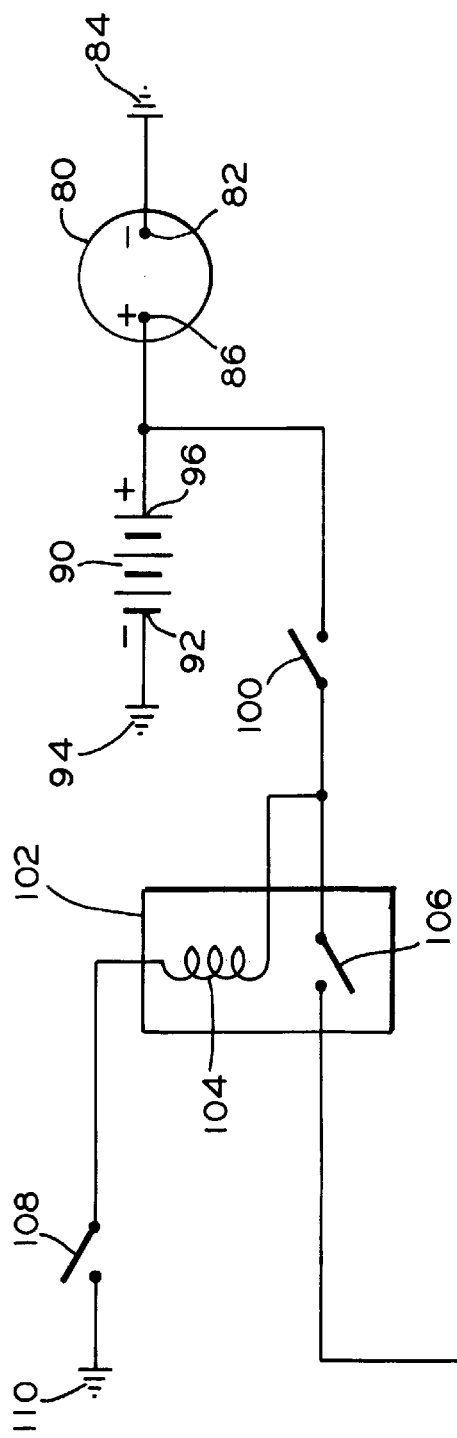
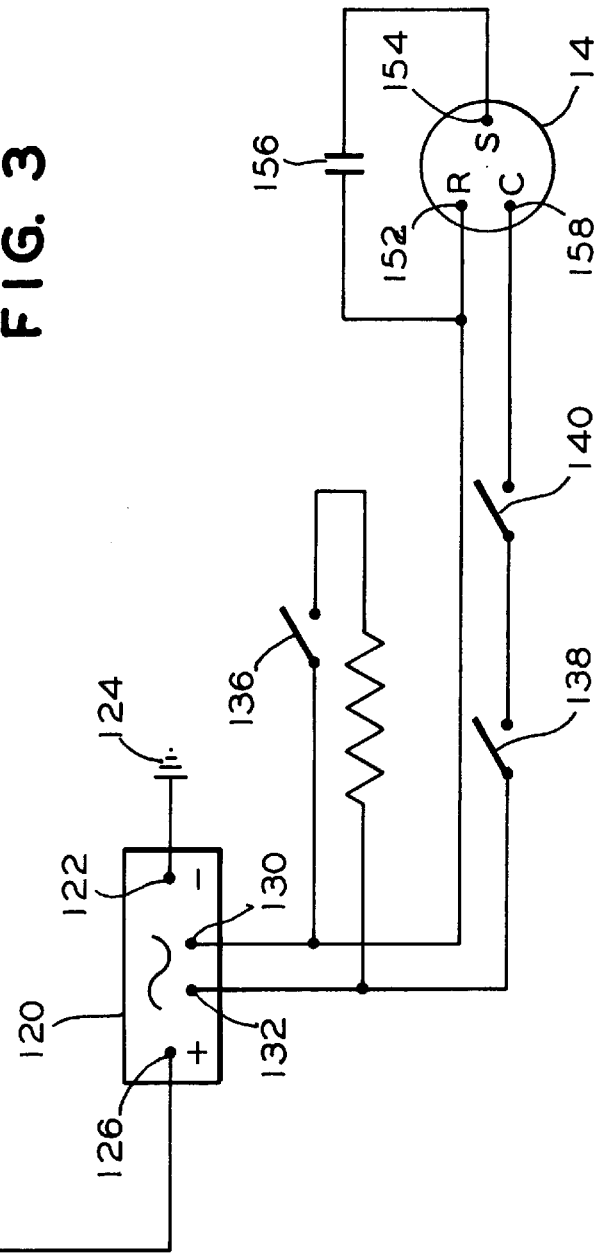
FIG. 3

AIR CONDITIONER FOR MOTOR VEHICLE

CROSS REFERENCE TO RELATED APPLICATIONS

This application is a continuation-in-part of application Ser. No. 08/839,108 now abandoned, filed Apr. 23, 1997 which has been allowed.

FIELD OF THE INVENTION

The present invention relates, in general, to an air conditioning system for a vehicle powered by an internal combustion engine, and, more particularly, this invention relates to an environmentally benign air conditioning system for use on such a motor vehicle.

BACKGROUND OF THE INVENTION

Air conditioning systems for motor vehicles are known which contain refrigerant fluids which generally are halogen compounds such as FREON, which is known in the industry as R-12. These compounds, when released into the Earth's atmosphere, are believed to be carried to the stratosphere, where they cause catalytic decomposition of the ozone, and hence cause environmental harm by increasing the amount of ultraviolet radiation reaching Earth's surface. For this reason, R-12 has been banned, as well as some other halogen-based refrigerants.

Prior art air conditioning systems for motor vehicles are generally of an open drive type. Motive power for the compressor is supplied by a shaft passing through the pressure boundary which contains the refrigerant. The shaft seals are subject to leaks which release the refrigerant to the atmosphere, and the shaft seals additionally introduce power losses due to friction.

These prior art systems are generally operated at variable speeds which depend on the speed of the engine of the motor vehicle. The need for the air conditioning system to provide sufficient cooling regardless of the speed at which it is driven necessitates design considerations which cause considerable power losses.

Prior art systems require an electromechanical device to alternatively connect the shaft of the compressor to a pulley driven by the motor of the vehicle and to disconnect the shaft of the compressor from the pulley. This electromechanical device is usually a solenoid which engages a clutch which connects the belt drive to the compressor. The solenoid draws significant electrical current whenever the air conditioner is in use, and thus introduces additional power losses.

These prior art systems also cause power loss even when the air conditioner is not in use because of the belt drive to the compressor.

Prior art systems also place a variable load on the engine of the vehicle. As the air conditioner cycles on and off, the load it places on the engine varies. This introduces a safety hazard, because the cycling occurs unexpectedly, and if the vehicle is in close proximity to other vehicles, the operator of the vehicle must respond quickly to changes in power demand of the air conditioner.

One prior attempt to provide a vehicular air conditioning system eliminates the open drive and the shaft seal of the systems discussed above. This system uses a DC motor located inside the pressure envelope. The DC motor is powered by the car's DC electrical system. Such an approach has the disadvantage that the brushes of the DC motor are subject to wear, require maintenance, and hence cause further releases of refrigerant to the atmosphere.

Additional background information is available from the art of window air conditioners for buildings. These have AC electrical motors inside a pressure envelope, and do not require a shaft seal. Power for the electrical motor is obtained from the wiring system of the building in which the air conditioner is mounted. This power is introduced into the pressure envelope by conduction paths which penetrate the pressure envelope, and are insulated from it. The unit is totally sealed from the atmosphere by brazed seals, so that loss of the refrigerant does not occur.

Information regarding the properties of some presently available refrigerants is presented in the following publications by DuPont Chemicals Inc., the teachings of which are incorporated herein by reference thereto.

Safety of SUVA* Refrigerants (AS-1)

DuPont SUVA* HP Refrigerants (P-HP)

SUMMARY OF THE INVENTION

In a first aspect, the present invention provides a motor-compressor assembly for use as a sole air conditioning system for a motor vehicle having an internal combustion engine. The assembly includes a fluid containment envelope, an alternating current electrical induction motor inside the envelope, the motor having at least one electrical winding and at least one moveable part. A compressor is provided which has a stationary part which may either be formed as a portion of the fluid containment envelope, or placed inside the fluid containment envelope. The compressor has a moveable part which is driven by the moveable part of the motor, and which cooperates with the stationary part of the compressor to pump or compress a refrigerant fluid.

The motor-compressor assembly has at least one inlet flow path passing through the fluid containment envelope, the inlet flow path having an outer portion formed for attachment of an external fluid passage. The assembly includes at least one outlet flow path passing through the fluid containment envelope, the outlet flow path having an outer portion formed for attachment of an external fluid passage.

The assembly also includes at least two electrical conduction paths carrying electrical current through the fluid containment envelope to the winding or windings of the motor. The assembly further has a means for attachment to the motor vehicle.

In a second aspect, the invention provides an air conditioning system for a motor vehicle which has an internal combustion engine. The invented system has a closed fluid containment envelope which has an internal space for a compressor, a fluid passage for a hot side of a heat exchanger for cooling the entire system, an internal space for an expansion valve, an internal space for a cold side of a heat exchanger which cools the motor vehicle, and a portion which provides internal space for an electrical motor. The system includes the electrical motor, which is an alternating current motor which has at least one moveable part, and at least one electrical winding. The system includes a stationary part of a compressor which may either be formed as a portion of the fluid containment envelope, or contained inside the fluid containment envelope. The compressor has a moveable part which is driven by the moveable part of the electrical motor. The moveable and stationary parts of the compressor cooperate to pump or compress a refrigerant fluid inside the containment envelope. At least two electrical conduction paths carry electrical current through the containment envelope to the winding or windings of the electrical motor. Power for the motor is supplied by an inverter which receives electrical power from the battery and/or the generator of the motor vehicle. An electrical switch is provided for controlling the voltage applied to the electrical motor. This switch is controlled by a temperature control means, and/or by the operator of the motor vehicle. The hot side of the heat exchanger which cools the entire system is cooled by means external to the containment envelope. Likewise, means external to the containment envelope are provided to transfer heat from the interior of the motor vehicle to the cold side of the heat exchanger which cools the interior of the motor vehicle. A charge of refrigerant fluid is placed inside the containment envelope.

OBJECTS OF THE INVENTION

It is, therefore, one of the primary objects of the present invention to provide an environmentally benign air conditioning system for motor vehicles.

Another object of the present invention is to provide an environmentally benign air conditioning system for motor vehicles which eliminates the open drive of the prior art vehicular air conditioning systems, and thus eliminate shaft seals which permit refrigerant to be lost to the atmosphere.

An additional object of the present invention is to provide an environmentally benign air conditioning system for motor vehicles that eliminates the friction which is caused by the shaft seals and the belt drive to the shaft.

A further object of the present invention is to provide a vehicular air conditioning system which is run at a speed which is optimum for the air conditioning system, rather than a speed which is dictated by the motor of the vehicle.

An additional object of the present invention is to provide an air conditioning system for a motor vehicle which does not require an electromechanical device to alternatively connect the shaft of the compressor to a pulley driven by the motor of the vehicle and to disconnect the shaft of the compressor from the pulley.

Yet an additional object of the present invention is to provide an air conditioning system for a vehicle which does not cause unexpected changes in power demand, since these cause a driving hazard when the vehicle is operated in close proximity to other vehicles.

Yet a further object of the present invention is to provide an air conditioning system for a motor vehicle which has a brushless AC induction motor inside the pressure envelope of the air conditioning system, so that replacement of brushes is not required.

In addition to the various objects and advantages of the present invention which have been generally described above, there will be various other objects and advantages of the invention that will become more readily apparent to those persons who are skilled in the air conditioning art from the following more detailed description of such invention, particularly, when such detailed description is taken in conjunction with the attached drawing figures and with the appended claims.

BRIEF DESCRIPTION OF THE DRAWINGS

FIG. 3 is an electrical schematic showing the alternator and battery, the inverter, the motor, the starting capacitor, a timer and various switches.

Figure 1:
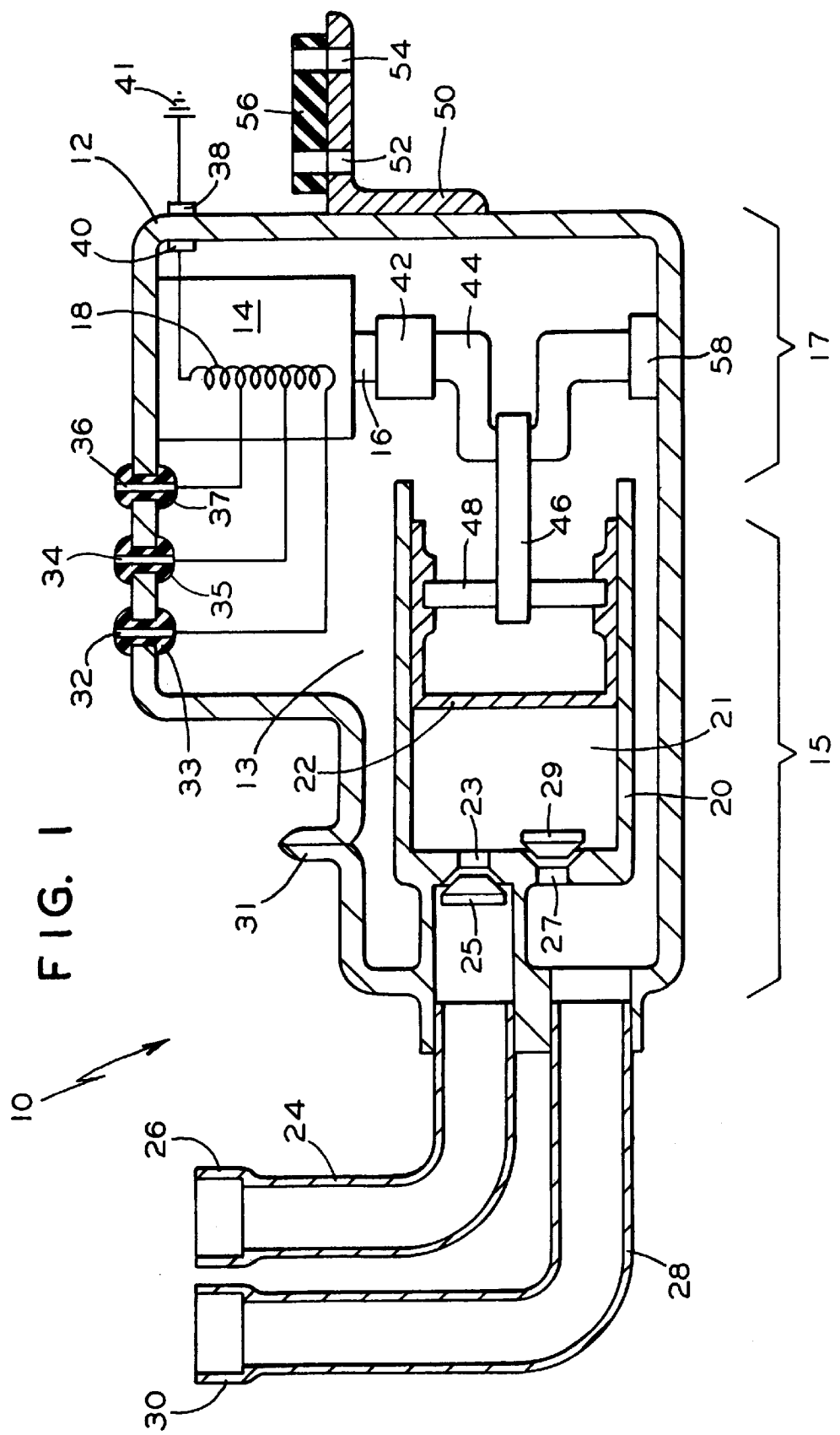
FIG. 1 is a schematic of the motor-compressor unit, including its fluid containment envelope.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the views illustrated in the drawing figures, for the sake of clarity and understanding of the invention.

Reference is now made to FIG. 1 which illustrates the presently preferred embodiment of the motor-compressor unit, generally indicated as 10. Motor compressor unit 10 is intended to be the sole air conditioning unit of a motor vehicle (not shown). This motor-compressor unit 10 has a fluid containment envelope 12, which encloses an interior space 13, which is filled with a refrigerant fluid. Envelope 12 has a portion 15 for a compressor and a portion 17 for a motor. An electrical motor 14 is disposed inside portion 17. Motor 14 has a moveable portion 16 and at least one electrical coil 18.

A compressor stationary portion 20 is shown inside envelope portion 15, the compressor stationary portion 20 enclosing an internal volume 21. A compressor moveable portion 22 is also shown. In this figure the moveable portion 22 is a piston having piston pin 48 and piston rod 46. Piston rod 46 is moved by crank 44 driven through coupling 42 from motor moveable portion 16. A bearing 58 may support the crank 44.

Electrical power is introduced through the fluid containment envelope 12 via electrical conduction paths 32, 34, and 36 which are insulated from such containment envelope 12 by insulating sleeves 33, 35, and 37. These sleeves are hermetically sealed to envelope 12 and to the conduction paths 32, 34, and 36, respectively, to prevent loss of refrigerant fluid from interior space 13. An additional path for electrical conduction may be supplied by terminals 38 and 40 which are electrically connected to the outside and the inside, respectively, of fluid containment envelope 12. For this case, the fluid containment envelope 12 is made of an electrically conductive material. It is preferred that terminal 38 be connected to a ground 41 of a motor vehicle (not shown) in which this unit is mounted.

An inlet flow path 28 communicates with interior space 13 of motor-compressor assembly 10. When piston 22 moves to increase the volume of space 21, it causes refrigerant fluid from space 13 to flow into space 21 through port 27, and it also causes fluid to be drawn into space 13 through inlet flow path 28.

When piston 22 moves to decrease the volume of space 21, fluid flows out of space 21 through orifice 23 to flowpath 24. During this part of the cycle, backflow from space 21 to space 13 is prevented by valve moveable portion 29, which moves to seat against orifice 27. (Means for controlling the motion of valve moveable portion 29 are not shown.) Inlet flow path 28 has an external attachment means 30 for attachment of an external fluid flowpath. External attachment means 30 may be a socket into which a tube (not shown), which is external to assembly 10, may be braised.

When piston 22 moves to increase the volume of space 21, backflow from flowpath 24 into space 21 is prevented by valve moveable portion 25 which seats against orifice 23. (Means for controlling the motion of valve moveable portion 25 are not shown.)

Outlet flow path 24 has an external attachment means 26 for attachment of an external fluid flowpath. External attachment means 26 may be a socket into which a tube (not shown), which is external to assembly 10, may be braised.

An additional external connection 31 may be provided for charging the system with refrigeration fluid. This may be accomplished by initially forming external connection 31 as a piece of tubing of a deformable metal such as copper. When the system which includes this motor-compressor assembly 10 has been filled with a refrigerant fluid, and is ready to be sealed off, external connection 31 may be pinched off and then hermetically sealed with liquid metal. For example, if connection 31 is made of copper, a brazing compound may be applied to the end which has been pinched off.

A mounting bracket 50 is provided for mounting the invented motor-compressor assembly 10 to a vehicle (not shown) in which motor-assembly 10 is located. Mounting bracket 50 may have mounting holes 52 and 54, and it may have an elastomeric pad 56.

Figure 2:
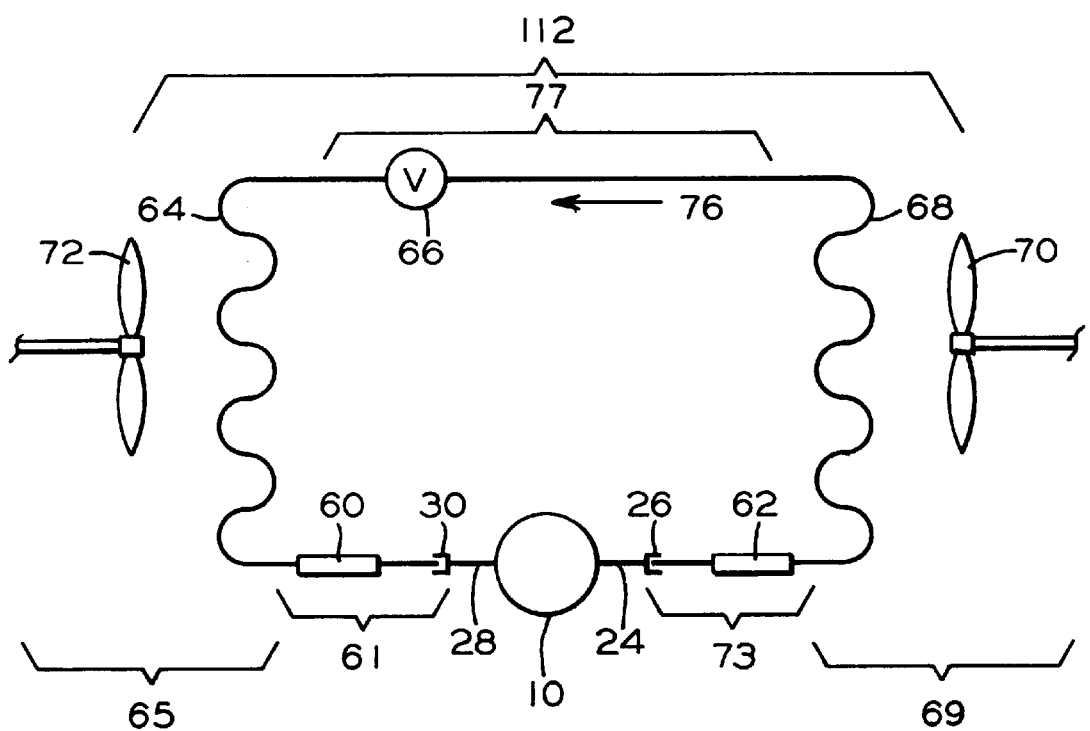
FIG. 2 is a schematic of the fluid flow circuit of the entire system, including the compressor, the hot coil, the expansion valve, and the cold coil.

FIG. 2 shows a diagram of the fluid circuit of the system. The motor-compressor assembly 10 has output flowpath 24 and external attachment means 26 for attachment of flowpath 73, which may have a vibration dampener 62. Flowpath 73 is connected to a hot heat exchanger, generally indicated as 69, having hot coil 68, which may be placed ahead of the radiator of the vehicle (not shown) in which the system is mounted. The radiator cooling fan 70 of the vehicle in which the system is mounted provides a stream of air passing over coil 68.

After heat has been removed from the refrigerant fluid present in coil 68, it flows in direction 76 through flowpath 77, which includes the expansion valve 66. It then enters the cold heat exchanger, generally indicated as 65, which includes cold coil 64 which is in thermal communication with the space to be cooled. Fan 72 causes an airstream to flow over coil 64 to cool the air. From coil 64, the air flows through flowpath 61 which may include vibration dampener 60 to external attachment means 30 of flowpath 28, through which the fluid returns to the motor-compressor assembly 10.

FIG. 3 shows a diagram of the electrical portions of the present invention. The source of electrical power 80 for the vehicle (not shown), has a negative terminal 82 connected to vehicle ground 84. This unit, which is herein referred to as a generator, may be an alternator having a built-in rectifier, according to the presently available art. It has a positive terminal 86. Energy storage means 90, which may be a battery, has a negative terminal 92 connected to vehicle ground 94. It has been found that the source of electrical power 80 and the battery 90 can both be standard units existing in contemporary automobiles. It has been found that due to the high efficiency of an electrically driven compressor, existing automobile generators having maximum outputs between 80 and 160 Amperes at 12 Volts are sufficient to provide excellent cooling power for an automobile. Such units produce electrical power in the range from 960 and 1920 Watts.

Energy storage means 90 has a positive terminal 96 connected to positive terminal 86 of the electrical power source 80. Respective positive terminals of these units, 86 and 96, are connected through a master electrical switch 100 to relay 102, which is open or closed in accordance with a current through coil 104. This current is controlled by switch 108, which connects it to vehicle ground 110. Switch 108 may be directly operable by an operator of the motor vehicle, or may be operable by a signal from one or more sensors of a temperature control or climate control system.

Relay 102 includes a power switch 106 which blocks or admits power to the inverter 120, which has a positive input terminal 126, and a negative terminal 122 connected to vehicle ground 124. Switch 106 should be normally open to block power to inverter 120 and closed to admit power only when coil 104 is energized. Switch 108 which admits power to coil 104 may be the switch in an existing shaft driven AC system which applies voltage to the solenoidal clutch which admits shaft power to the compressor.

It should be noted that if the vehicle has an electrical system in which the positive battery terminal and the positive alternator terminals are grounded, power being drawn from the negative terminals, then positive and negative in the preceding discussion would be reversed. In addition, for either case, ground connections 84, 94 and 124 may be replaced by a current return conductor to the electrical power source 80 and the energy storage means 90.

The alternator produces power at an alternating voltage across terminals 130 and 132. Some of this power is used for a crankcase heater 134 which is controlled by a thermally activated switch 136, so that if electrical power is applied to the system through terminals 130 and 132, and the crankcase is too cold, the crankcase will be heated until it is warm enough for operation. Switch 136 will then open to prevent further power drain through the crankcase heater 134.

AC electrical power for the motor 14 is supplied through thermally activated switches 138 and 140. Switch 138 is a low temperature cutout and switch 140 is a high temperature cutout. Switch 138 prevents power from being supplied to the motor 14 if the crankcase temperature, which may be measured on the outside of envelope 12, is too cold for operation. This switch 138 may have the same thermal control as switch 136, so that one and only one of these is closed at any time. Switch 140 is preferably located in the motor windings, and opens on high temperature to protect the windings of motor 14 from being burned out in the event of an overload.

It is preferred that a timer 170 be included to prevent power from reaching motor 14 for a case in which motor-compressor assembly 10 has recently been turned off. Timer 170 may be placed in line 174 connecting alternator output terminal 130 and motor run terminal 152. Timer 170 has contacts 176 to interrupt line 174 until a predetermined time has elapsed since the motor-compressor assembly 10 was turned off. Power for operating timer 170 may be supplied by line 178 which is electrically connected to battery terminal 96 and alternator terminal 86, as well as line 179 to vehicle ground 173. A timer for the same purpose may alternatively be placed in series with switch 190 to interrupt power to relay 102 (not shown).

Motor 14 may be a capacitor start type motor having a run terminal 152, a start terminal 154 and a common terminal 158. For this case, a capacitor 156 connects the run and start terminals. Such capacitor 156 may be located outside the fluid containment envelope 12, but motor 14 is located inside it. Power is introduced through the envelope 12 through at least two electrical conduction paths which may be 32, 34 or 36, or may use, for one path, the path from terminal 38 to the terminal 40 through the envelope 12.

In an embodiment of this invention which is presently most preferred for early implementation, the inverter 120 generates a voltage of about 120 Volts at about 60 Hz. The motor-compressor unit 10 would be taken from the art of window air conditioners for buildings, which operates on this voltage, single phase. Following that art, the motor would be a split phase capacitor start motor. For this embodiment, the inverter 120 would have an electrical design similar to that of present-day inverters, but would have a physical configuration adapted to fit inside available space in the vehicle. The motor-compressor unit 10 and the inverter 120 may be mounted on either the motor, the chassis, or the body of the vehicle.

In another embodiment, the AC voltage supplied by the inverter 120 would be a voltage chosen to be optimal for the combination of the inverter 120 and the motor 14. A voltage may be chosen which does not require a transformer. This voltage may be much less than 120 volts, and would depend on the voltage of battery 90. For this case, it is preferred that this inverter supply three phase power to motor 14, which would be a three phase electrical induction motor.

In one aspect, this invention provides a motor-compressor assembly 10 which has a fluid containment envelope 12 which encloses the motor 14. The compressor has a stationary portion 20 which may either be inside the envelope 12, or be formed as a portion of it. The motor 14 includes at least one electrical winding 18, and has a moveable portion 16 which is connected to, and drives, a moveable portion 22 of the compressor. The moveable portion 22 of such compressor cooperates with the stationary portion 20 to compress or pump a refrigerant fluid.

An inlet flow path 28 is provided passing through the fluid containment envelope 12, and this inlet flow path 28 has an external attachment means 30 formed for attachment of an external fluid passage means 61. This external attachment means 30 may be a socket into which a metal tube may be braised.

An outlet flow path 24 is provided passing through the fluid containment envelope, and this outlet flow path 24 has an external attachment means 26 formed for attachment of an external fluid passage means 73. This external attachment means 26 may be a socket into which a metal tube may be braised.

At least two electrical conduction paths are provided for carrying electrical currents through such fluid containment envelope 12 to the winding 18 or windings of such electrical motor 14.

A bracket 50 or other mounting means is provided on the assembly 10, for mounting it in the motor vehicle. This mounting means 50 may include vibration damping means, such as elastomeric pads 56.

One of the electrical conduction paths may include a portion of the envelope, which, for this case, conducts electricity between terminals 38 and 40. Another electrical conduction path may pass through the envelope and be electrically insulated from it. Three paths 32, 34, and 36 may be provided, one connected to a run terminal 152 of the electrical motor 14 another connected to a start terminal 154 of the motor 14, and another connected to a common terminal 158 of the motor 14. Three paths may also be provided, to supply power to motor 14, in which case motor 14 is a three phase electrical induction motor.

The motor-compressor assembly 10 may be provided containing the refrigerant fluid at a positive pressure which may be substantially less than one atmosphere. This is done to ensure that the assembly 10 is free of both air and moisture. Removable sealing means such as rubber stoppers (not shown) may be applied to the inlet attachment 30 and the outlet attachment 26 of this unit. After the motor-compressor assembly 10 is built into a cooling system, additional refrigerant fluid would be added, and then it would be sealed to prevent fluid loss.

The flow path may be designed so that the electrical motor 14 is surrounded by the inlet fluid, so that it is cooled by the fluid.

The electrical motor 14 should be of a type having a low starting current. It may, for example, be either a split phase capacitor start motor, or a polyphase induction motor such as a three phase induction motor.

The assembly 10 may, in addition to having the inlet flow path 28 and the outlet flow path 24, include an additional flow path 31 for charging the system with refrigerant fluid. Such flow path 31 should be mechanically closeable and hermetically sealable. For example, flow path 31 may be a tube of soft metal such as copper which may be pinched off, and then braised to seal the pinched off end. Assembly 10 may be retrofitted into an existing motor vehicle air conditioning system. The existing shaft driven compressor would be removed. This removal would include cutting the tube carrying coolant from the compressor to the hot coil which, typically, is in the airstream ahead of the radiator. The return tube from the cold coil to the compressor inlet would also be cut, and the electrical connection to the electromagnetic clutch would be disconnected. The old shaft driven compressor would then be removed, and assembly 10 would be mounted in its place.

Assembly 10 will generally be smaller than the shaft driven unit which it replaces because it is never required to supply maximum cooling at idling speeds, as is necessary for a shaft driven system. It is preferred but not necessary that inverter 120 be mounted on assembly 10. The cut end of the tube to the hot coil would then be braised to outlet 26 and the tube from the cold coil would be braised to inlet 30. The electrical connection to the electromagnetic clutch of the shaft driven system would then be connected to coil 104 of relay 102.

In an additional aspect, this invention provides an air conditioning system for a motor vehicle having a fluid containment envelope 112 having a first portion 15 for a compressor, a second portion including a hot side 68 of a first heat exchanger 69, a third portion 77 containing an expansion valve 66, a fourth portion formed as a cold side 64 of a second heat exchanger 65, and a fifth portion 17 for enclosing an electrical motor. The first portion includes a fluid flow connection to the second portion, the second portion includes a fluid flow connection to the third portion, the third portion includes a fluid flow connection to the fourth portion, and the fourth portion includes a fluid flow connection to the first portion.

An alternating current electrical motor is disposed within the fifth portion 17, the motor having a moveable portion 16 and an electrical winding 18.

A compressor stationary portion 20 may either be contained within the first portion 15 of the fluid containment envelope 112, or be formed as a portion of it. A compressor moveable portion 22 has mechanical attachment to motor moveable portion 16, to be moved by motor moveable portion 16. Compressor moveable portion 22 cooperates with compressor stationary portion 20 to pump or compress a refrigerant fluid, which flows to the second portion 68 which is the hot side of heat exchanger 69. The refrigerant fluid then flows to the third portion 77 of the fluid containment envelope 112, where it is cooled as it passes through expansion valve 66. It then flows to the fourth portion 64, which is the cold side of heat exchanger 65, which cools a space in the motor vehicle.

The system has at least two electrical conduction paths, including at least one of the paths 32, 34 and 36, and may also include a path between terminal 38 and terminal 40 through the envelope. These electrical conduction paths are for carrying electrical current through the fluid containment envelope to the electrical motor.

The system also has an inverter which receives DC electrical power from the battery and/or generator of the vehicle and converts it to AC power which it sends through the two or more electrical conduction paths to the motor.

One or more switches is provided to turn on or off the voltage applied to the electrical motor. One or more of these switches may be directly controlled by an operator of the vehicle, or by a temperature control means such as a thermostat.

Means 70, external to the fluid containment envelope 112, cools the hot side 68 of the first heat exchanger 69. Means 72, external to the fluid containment envelope 112, facilitates transfer of heat from a space in the motor vehicle to the cold side 64 of heat exchanger 65.

The system also includes a charge of refrigerant fluid inside the fluid containment envelope.

This system may be designed such that the fluid flow path from the fourth portion 64 to the first portion 15 passes through the fifth portion 17, so that the fluid cools the electrical motor 14.

The inverter 120 may provide a substantially constant frequency, and its voltage may be about 120 Volts. Inverter 120 may also provide power at a voltage which does not require a transformer, in which case the electrical motor 14 is adapted to that voltage.

The inverter 120 may be in thermal contact with a portion of the fluid containment envelope so that heat is removed from the inverter 120.

The electrical motor 14 may be an electrical induction motor, which may be a split phase capacitor start electrical induction motor, or a polyphase induction motor such as a three phase motor.

For a case in which motor 14 is a capacitor start motor, the capacitor may be located outside the pressure envelope 12. Three electrical conduction paths such as 32, 34 and 36, or the conduction path from terminal 38 to terminal 40 are required passing through the pressure envelope 12 for this case.

If the electrical motor 14 is a three phase electrical induction motor, three electrical conduction paths such as the above are required passing through the pressure envelope 12. In this case, inverter 120 supplies three phase electrical power.

The hot heat exchanger 69 may include a cooling means 69 which may be the radiator fan of the motor vehicle. Likewise, transfer of excess heat from a space located inside the motor vehicle to the cold heat exchanger 65 may be facilitated by a fan or blower 72.

The refrigerant fluid may be the fluid known to persons skilled in the art as R-22.

To eliminate potential leak sites, molten metal may be used for casting, joining, or sealing. For example, flowpath 73 may be joined to outlet attachment 26 by brazing.

The expansion valve 66 may be formed as, or include, a plurality of capillaries disposed flowwise in parallel with each other.

While a presently preferred and various additional alternative embodiments of the instant invention have been described in detail above in accordance the patent statutes, it should be recognized that various other modifications and adaptations of the invention may be made by those persons who are skilled in the vehicle air conditioning art without departing from either the spirit of the invention or the scope of the appended claims.

I claim:

1. A motor-compressor assembly for use in a sole air conditioning system for a motor vehicle having an internal combustion engine and an electrical generator, said motor-compressor assembly comprising:
   (a) a fluid containment envelope;
   (b) an alternating current electrical induction motor disposed within said fluid containment envelope, said electrical induction motor having at least one electrically moveable portion, said electrical induction motor having at least one electrical winding, said electrical induction motor having a power demand between 960 and 1920 Watts;
   (c) a compressor stationary portion being one of disposed within said fluid containment envelope and formed as a portion of said fluid containment envelope;
   (d) at least one compressor moveable portion disposed within said fluid containment envelope, said at least one compressor moveable portion for at least one of compressing and pumping a refrigerant fluid in cooperation with said compressor stationary portion, said at least one compressor moveable portion having mechanical attachment to said at least one electrically moveable portion of said electrical motor;
   (e) at least one inlet flow path disposed on said compressor passing through said fluid containment envelope, said inlet flow path having an external attachment means formed for attachment of an external fluid passage means;
   (f) at least one outlet flow path disposed on said compressor passing through said fluid containment envelope, said outlet flow path having an external attachment means formed for attachment of an external fluid passage means;
   (g) at least two electrical conduction paths for carrying electrical current through said fluid containment envelope to said at least one electrical winding of said electrical induction motor;
   (h) an external fluid connection passing through said fluid containment envelope for charging said air conditioning system with a refrigerant fluid, said external fluid connection being made of metal and formed so as to be mechanically closeable, and to be sealable with molten metal; and
   (i) means disposed on said motor-compressor assembly for attaching said motor-compressor assembly to such motor vehicle.

2. A motor-compressor assembly, according to claim 1, wherein said means disposed on said motor-compressor assembly for attaching said motor-compressor assembly to such motor vehicle at least one of provides for and includes vibration damping means.

3. A motor-compressor assembly, according to claim 2, wherein said vibration damping means includes at least one elastomeric pad.

4. A motor-compressor assembly, according to claim 1, wherein one of said at least two electrical conduction paths includes at least a portion of said fluid containment envelope, and wherein said fluid containment envelope conducts electricity.

5. A motor-compressor assembly, according to claim 1, wherein at least one of said at least two electrical conduction paths is a path passing through said fluid containment envelope, and electrically insulated from said fluid containment envelope.

6. A motor-compressor assembly, according to claim 1, wherein said at least two electrical conduction paths are at least three electrical conduction paths;

a first one of said at least three electrical conduction paths connected to a run terminal of said electrical motor, a second one of said at least three electrical conduction paths connected to a start terminal of said electrical motor, and a third one of said at least three electrical conduction paths connected to a common terminal of said electrical motor.

7. A motor-compressor assembly, according to claim 1, wherein said assembly contains said refrigerant fluid at a relatively small positive pressure, said refrigerant fluid protected from contamination by removable sealing means applied to said at least one inlet and said at least one outlet.

8. A motor-compressor assembly, according to claim 1, wherein said inlet flow path includes at least a portion of said electrical motor, and wherein said electrical motor is cooled by said refrigerant fluid.

9. A motor-compressor assembly, according to claim 1, wherein said alternating current electrical induction motor is a three phase electrical induction motor.

10. An air conditioning system for a motor vehicle having an internal combustion engine and an electrical generator, said air conditioning system comprising:
   (a) a closed fluid containment envelope having a first portion for providing at least one internal space for a compressor, a second portion formed as at least one fluid passage for a hot side of a first heat exchanger, a third portion for providing at least one internal space for at least one expansion valve, a fourth portion formed as at least one fluid passage for a cold side of a second heat exchanger, a fifth portion for providing at least one internal space for enclosing an electrical motor, said first portion of said containment envelope including a fluid flow connection to said second portion of said containment envelope, said second portion including a fluid flow connection to said third portion of said containment envelope, said third portion including a fluid flow connection to said fourth portion of said containment envelope, said fourth portion including a fluid flow connection to said first portion of said containment envelope;
   (b) an alternating current electrical motor disposed within said fifth portion of said closed fluid containment envelope, said alternating current electrical motor having at least one moveable portion, and said alternating current electrical motor having at least one electrical winding, said electrical motor having a power demand between 960 and 1920 Watts;
   (c) a compressor stationary portion, said compressor stationary portion at least one of contained within and formed as at least a subportion of said first portion of said fluid containment envelope;
   (d) a compressor moveable portion mechanically connected to said at least one moveable portion of said electrical motor, to be moved by said at least one moveable portion of said electrical motor, said compressor moveable portion for cooperating with said compressor stationary portion for at least one of pumping and compressing a fluid disposed within said fluid containment envelope;
   (e) at least one expansion valve at least one of contained within and formed as at least a subportion of said third portion of said fluid containment envelope;
   (f) at least two electrical conduction paths for carrying electrical current through said fluid containment envelope to said at least one electrical winding of said electrical motor;
   (g) an inverter for receiving DC power from at least one of a battery and a generator disposed on such motor vehicle, for producing AC power, and for supplying said AC power to said at least two electrical conduction paths;
   (h) at least one electrical switch for control of a voltage applied to said electrical motor, said at least one electrical switch controlled by at least one of a temperature control means and an operator of such motor vehicle;
   (i) at least one timer for control of said voltage applied to said electrical motor, said timer preventing said air conditioning system from attempting to restart during a predetermined time interval following shutdown of said air conditioning system;
   (j) means external to said fluid containment envelope for cooling said hot side of said first heat exchanger;
   (k) means disposed within such motor vehicle but external to said fluid containment envelope for transfer of heat from at least one space in such motor vehicle to said cold side of said second heat exchanger; and
   (l) a charge of refrigerant fluid disposed within said fluid containment envelope.

* * * * *